(12) United States Patent
Wesseler et al.

(10) Patent No.: US 9,493,944 B1
(45) Date of Patent: Nov. 15, 2016

(54) THERMODYNAMICALLY BALANCED INSULATION SYSTEM

(71) Applicants: Henry Wesseler, Bensenville, IL (US); John Apostolopoulos, Lake in the Hills, IL (US)

(72) Inventors: Henry Wesseler, Bensenville, IL (US); John Apostolopoulos, Lake in the Hills, IL (US)

( * ) Notice: Subject to any disclaimer, the term of this patent is extended or adjusted under 35 U.S.C. 154(b) by 0 days.

(21) Appl. No.: 14/809,792

(22) Filed: Jul. 27, 2015

(51) Int. Cl.
*E04B 1/76* (2006.01)
*E04B 1/80* (2006.01)
*A01G 13/04* (2006.01)

(52) U.S. Cl.
CPC ............. *E04B 1/7612* (2013.01); *A01G 13/04* (2013.01); *E04B 1/7675* (2013.01); *E04B 1/80* (2013.01)

(58) Field of Classification Search
CPC ... A01G 13/04; E04B 1/7675; E04B 1/7612; E04B 1/80
USPC ............... 52/172; 428/34, 137, 32.6, 74, 75; 47/31.1, 29.5; 137/296, 297, 301, 294
See application file for complete search history.

(56) References Cited

U.S. PATENT DOCUMENTS

| | | | | |
|---|---|---|---|---|
| 565,013 | A * | 8/1896 | Moodie | E03B 9/06 137/296 |
| 1,370,974 | A * | 3/1921 | Kirlin | C03B 23/245 428/34 |
| 4,567,080 | A * | 1/1986 | Korsgaard | E04B 1/66 428/137 |
| 5,878,776 | A * | 3/1999 | Love | F16L 59/161 137/375 |
| 7,497,048 | B2 * | 3/2009 | Bakowski | A01G 13/043 135/100 |
| 8,657,067 | B1 * | 2/2014 | Mathur | G10K 11/168 181/284 |
| 2003/0071374 | A1 * | 4/2003 | Engh | F28F 25/087 261/112.1 |
| 2003/0165663 | A1 * | 9/2003 | Christopherson | B32B 3/10 428/137 |
| 2005/0067014 | A1 * | 3/2005 | Knappmiller | F16K 27/12 137/296 |
| 2005/0249917 | A1 * | 11/2005 | Trentacosta | B01D 39/1692 428/137 |
| 2006/0012471 | A1 * | 1/2006 | Ross, Jr. | A42B 3/0453 340/479 |
| 2008/0057334 | A1 * | 3/2008 | Schroth | C04B 30/02 428/615 |
| 2009/0314696 | A1 * | 12/2009 | Trentacosta | A62B 17/006 210/97 |
| 2012/0027972 | A1 * | 2/2012 | Kapur | G05D 23/192 428/35.7 |
| 2012/0114883 | A1 * | 5/2012 | Kapur | B32B 38/04 428/34.1 |
| 2013/0142972 | A1 * | 6/2013 | Raggio | E06B 3/66304 428/34 |

FOREIGN PATENT DOCUMENTS

| | | | | | |
|---|---|---|---|---|---|
| DE | | 3524652 A1 | * | 1/1987 | ........... A01G 13/043 |
| DE | 102007005757 A1 | * | 8/2008 | | |
| DE | 102011050830 A1 | * | 12/2012 | ........... E04B 1/7675 | |
| FR | | 1498452 A | * | 10/1967 | ............... E04B 1/80 |

* cited by examiner

*Primary Examiner* — Babajide Demuren
(74) *Attorney, Agent, or Firm* — Clifford H. Kraft

(57) ABSTRACT

An insulation system that includes opposing panels with a partial dead air space in equilibrium with outside air. In one embodiment, two panels are supported parallel to one another separated by a distance. Each of the panels has a plurality of openings. The openings on facing panels are offset from one another so that openings on the two sides are not aligned. The openings are small enough so that a small amount of diffusion can occur allowing the panel to breathe. The panels can be used in attics, over windows or part of a building. In an alternate embodiment, they can be made from flexible sheets and be used to prevent fire hydrants or other objects from freezing. When used in attics, the panels will support weight allowing them to be walked on or used to store objects.

12 Claims, 6 Drawing Sheets

THERMODYNAMICALLY BALANCED INSULATION SYSTEM

BACKGROUND

1. Field of the Invention

The present invention relates to thermal insulation and more particularly to a system of solid or flexible insulation pieces that are thermodynamically balanced.

2. Description of the Prior Art

It is well-known in the art to use a dead air space to insulate. This works because air is a very poor thermal conductor. However, a totally dead air space covering or surrounding an item to be insulated does not allow the item to breathe. This can result in moisture buildup with undesirable consequences. Hence, most building insulation is made from a large number of small fibers woven or packed together. Fiber glass insulation is an example of this. The tightly woven glass fibers provide a precarious path for air molecules and hence form an air space that only allows very slow breathing. However, Insulation like fiberglass and many others are difficult to handle, many times causing itching or allergic reactions in workers. The powder or fibers are also dangerous to breathe. In addition, insulation bats like fiberglass compress and will not support weight. Powdered or chunk insulation in attics and other locations suffer from the same problem. They will not support much weight, and they create dust when handled. Hence it is difficult to store items in such attics, and it is very difficult to walk since one can only step on joists.

What is needed is insulation that contains an almost dead air space; however, an air space that allows slow breathing by using offset openings on opposite sides of panels to prevent moisture buildup on lower surfaces.

All insulation has thermal losses, including totally dead air spaces. The major causes of thermal loss of an insulated object are 1) thermal conduction, 2) radiation, and 3) convective cooling. If the object is in direct contact with only air, loss by thermal conduction is small. Also, at the low temperatures encountered in insulating structures, radiation loss is also small. However, if the air can move past the object, convective cooling causes major losses. The purpose of almost all building insulation is to minimize convective cooling. A dead air space or almost dead air space accomplishes this.

It is well-known that the rate of convective cooling is proportional to object temperature, the air temperature, and most predominately, the rate of airflow past the surface of the object. It is the latter parameter that a dead air space or almost dead air space minimizes. Air is only allowed to defuse into and out of the almost dead air space, and hence the rate of airflow is very small near the surface of the object. This leads to very low values of convective cooling.

It would be very advantageous to have a thermal insulation technology that operates on the principle of an almost dead air space that is allowed to breathe by diffusion, but has openings on opposite sides of panels or sheets offset from one-another, and that is rigid enough to support stored weight or to be walked upon.

SUMMARY OF THE INVENTION

The present invention relates to an insulation technology that uses thermal insulators that contain a partial dead air space in thermodynamic equilibrium with outside air for breathing. In a particular embodiment, two rigid panels are supported parallel to one another separated by a fixed distance. The panels may be transparent material such as Lucite (PLEXIGLAS), or they may be translucent or opaque. They may be rigid or flexible. Each of the panels has a plurality of small openings of any shape formed in a grid pattern or any other pattern. The opening patterns on the two facing panels are offset from one another so that openings on the two sides are not aligned. The openings are small enough so that a small amount of diffusion can occur allowing the panel to breathe. The rigid panels can be used in attics, over windows and to form insulators for any object or part of a building. When used in attics, the panels mounted on top of joists will support weight allowing them to be walked on or used to store objects. Flexible embodiments of the invention can be used to cover anything for thermal protection.

In a flexible embodiment, the panels are made of flexible material like plastic sheeting (MYLAR for example) with the same offset patterns of openings. These flexible panels may be used to cover objects that need thermal protection. A particular embodiment of the present invention can be used to cover a fire hydrant in winter to help prevent freezing and to provide surface protection.

The panels, both in the rigid and flexible cases, cause the region between the panels to be a partial dead air space. The openings allow breathing without excessive thermal loss. Rigid panels may optionally have drain or weep ports or drain tubes to remove any accumulated moisture.

DESCRIPTION OF THE FIGURES

Attention is now directed at several figures that illustrate features of the present invention.

Several drawings and illustrations have been presented to aid in understanding the present invention. The scope of the present invention is not limited to what is shown in the figures.

DESCRIPTION OF THE PREFERRED EMBODIMENTS

The present invention relates to a technology that uses offset patterns of openings in rigid or flexible insulators that contain a partially dead air space between two panels or flexible sheets. The panels or sheets each have a pattern of small openings. The openings in the rear panel or sheet are offset, and do not align with the openings in the front panel or sheet. Offsetting the opening patterns lowers the rate of total diffusion from one side of the unit to the other.

Figure 1:
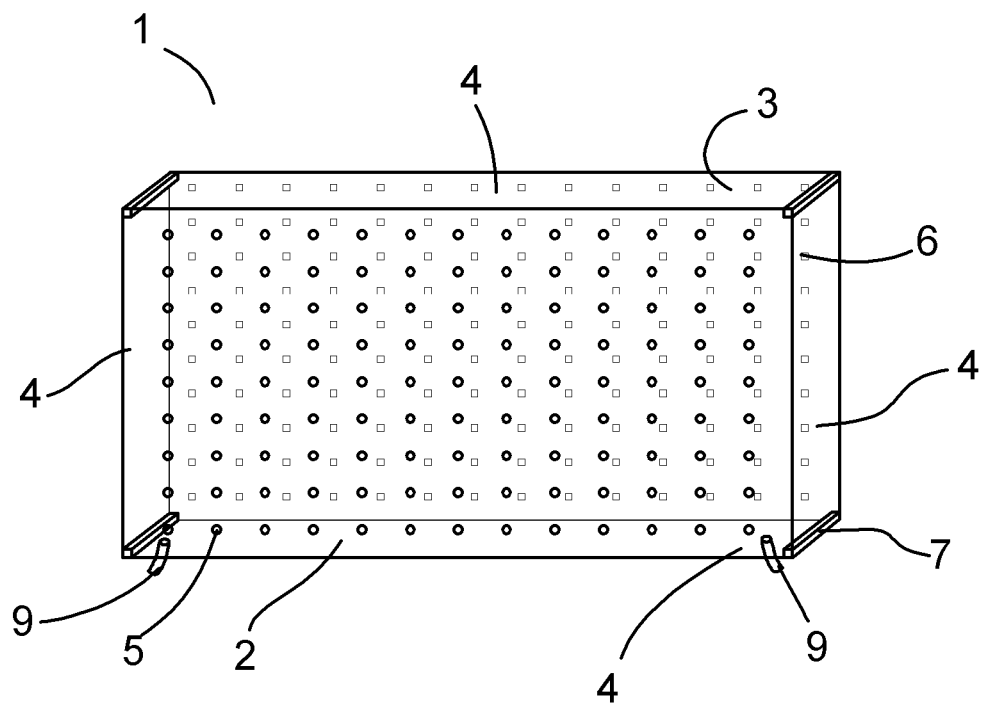
FIG. 1 shows a perspective view of a rigid panel according to the present invention.

Turning to FIG. 1, a perspective view of a rigid embodiment of the present invention can be seen. The unit 1 includes a front panel 2, a rear panel 3 and four sides 4. The front panel has a regular opening pattern 5. The rear panel has a similar opening pattern 6 that is offset from the front opening pattern 5. As previously stated, offsetting the opening patterns cuts the front to back diffusion rate. The front and rear panels 2, 3 are held apart by a plurality of spacers 7. A spacer 7 can be attached between the panels at all four corners, and there can be any number of similar spacers 7 between the panels away from the corners. The rigid unit 1 can have one or more optional drains 9 to remove excess moisture.

Figure 2:
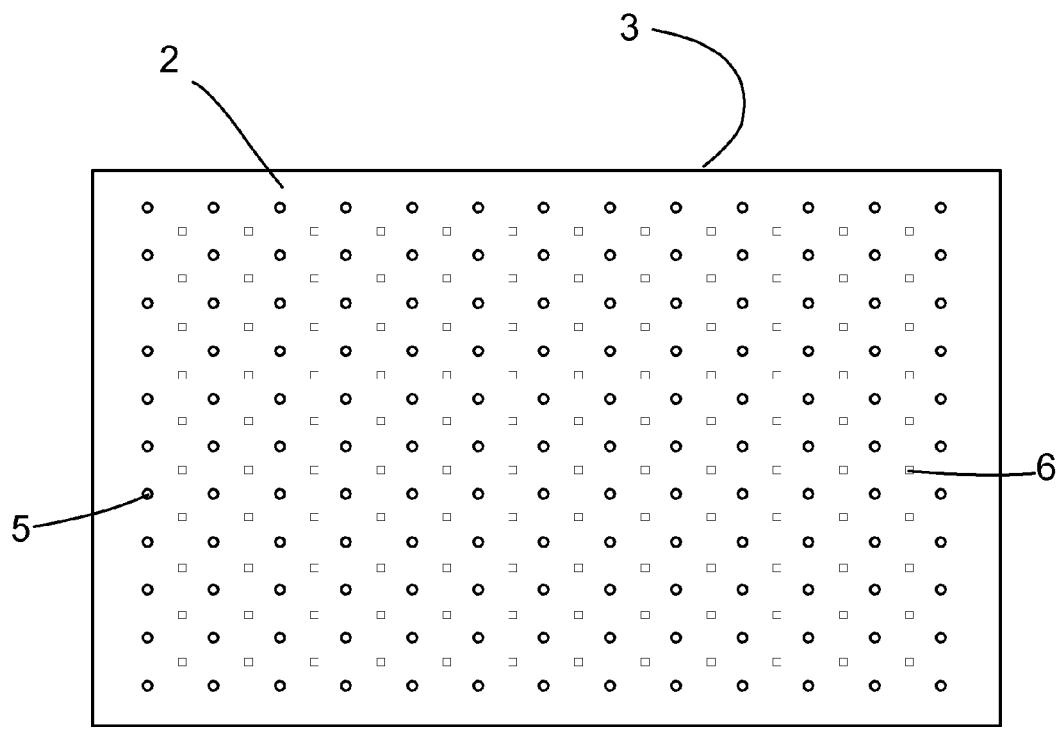
FIG. 2 shows a straight-on view of the embodiment of FIG. 1 showing the offset opening pattern between the front and back faces.

FIG. 2 shows a straight-on view of the panels 2 and 3 of the embodiment of FIG. 1. It can be clearly seen that the opening pattern 6 on the rear panel 3 is offset from the opening pattern 5 on the front panel 2. The spacers are not shown in FIG. 2 for clarity. For clarity, the front openings 5 are shown as circles, and the rear openings 6 are shown as squares. This is only for clarity. Typically, the openings front and rear would be the same shape and fairly small. Any type of opening pattern, any number of openings, and any shape of the openings is within the scope of the present invention.

Thermal loss occurs because of a small amount of direct conduction across the dead air space from back to front and along the sides, radiation from the surfaces of the front and rear panels, and thermal energy carried by convection as air diffuses through the openings in the rear panel, through the dead air space, and through the small openings in the front panel.

Thermal conduction is determined by thermal conductivity of the material and the temperature difference on the two sides.

Direct conduction loss rate=$c(T2-T1)$ where c is the total conductivity front to back, T2 is the rear temperature and T1 is the front temperature.

Because c is very small across the dead air space, this quantity is very small.

Radiation is proportional to the third power of absolute temperature and leaves the unit as blackbody radiation with most energy in the infra-red at typical building temperatures.

Radiation loss rate=$q\ T^3$ where q is the radiation coefficient of the surface.
T to the third power is again quite small at building temperatures.

The major loss is convection of air through the system from back to front. Since the unit is designed to breathe, a small amount of warmer air diffuses in through the rear openings while a small amount of the dead air diffuses out of the rear openings. Also, a small amount of colder air diffuses in through the front openings, and a small amount of dead air diffuses out of the front openings. This represents a tiny airflow both directions, warm air flowing out and colder air flowing in. However, the rate of diffusion depends on the opening size. It should be noted that there is only random diffusion since the pressure on all sides of the unit is approximately ambient—if there is excess pressure on the rear side possibly caused by a furnace blower or air conditioner, there will be an increase in diffusion from rear to front due to the pressure gradient. This effect is greatly reduced if there is a layer of sheet rock or plywood on the ceiling below the insulation (which is the typical case). In general then, the random diffusion flux is independent of temperature difference (to the first order) and really only depends on the opening size and the total number of openings.

Total Diffusion Flux $J$=const $u\ D\ N$ alpha where J is the random diffusion flux, u is a mobility constant for air, D is the opening diameter, and N is the number of openings. Alpha is a opening-offsetting parameter that is maximum when the openings are aligned.

In the above equation, the spacing between the panels has been ignored since, for the most part, it does not play an important role after thermodynamic equilibrium is reached. A typical spacing or separation can be between ⅛ inch or smaller to several inches, such as two or three inches or greater. The opening offsetting serves to reduce the diffusion flux. Opening offsetting is more important for panels that are closer together than it is for panels that are widely spaced. Thus, the exact value of alpha as a function of opening offsetting also depends on the distance between the plates.

The optimum opening size and number of openings for any particular panel can be determined by testing. Offsetting should generally place the openings on the two panels at maximum offset based on the pattern.

Figure 3:
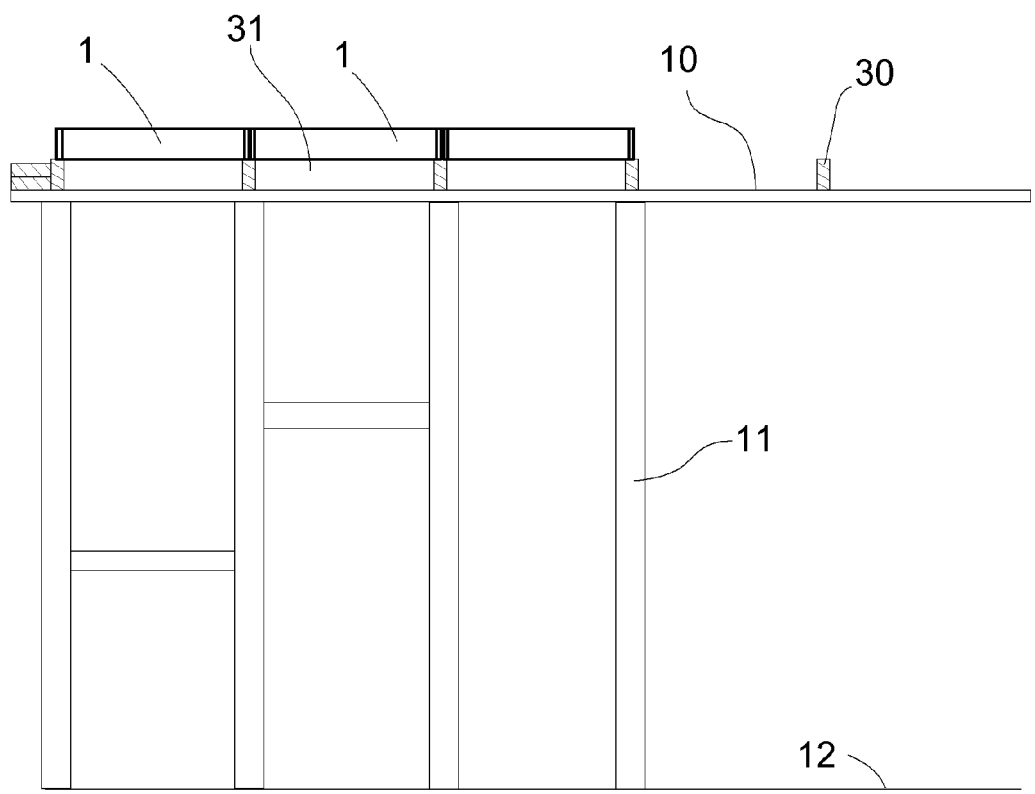
FIG. 3 shows embodiments of the flat, rigid panels being used as ceiling or attic insulation.

FIG. 3 shows the embodiment of FIGS. 1-2 used as attic insulation in a building. The units 1 are placed on top of the ceiling joists 30. The panels can be sized in width to fit typical construction and can be elongated. The ceiling is supported by the wall studs 11 that attached to a floor and foundation 12. A layer 10 of sheet rock, plywood or other ceiling material covers the ceiling in a normal manner. An additional space 31 appears below the panels 1 and the ceiling 10. Typically, this space is left unfilled. The actual thickness (distance between the top and bottom panels) of the units 1 may be less or more than what is shown in FIG. 3. Depending upon the material the panels are made of and the strength of the spacers, it is generally possible to walk on top of the units 1 and to store items on them (as long as not all the openings are covered).

Figure 4A:
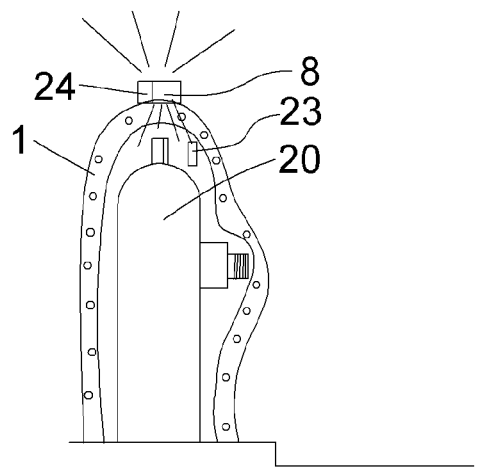
FIGS. 4A and 4B show a flexible embodiment of the present invention being used to cover a fire hydrant.
Figure 4B:
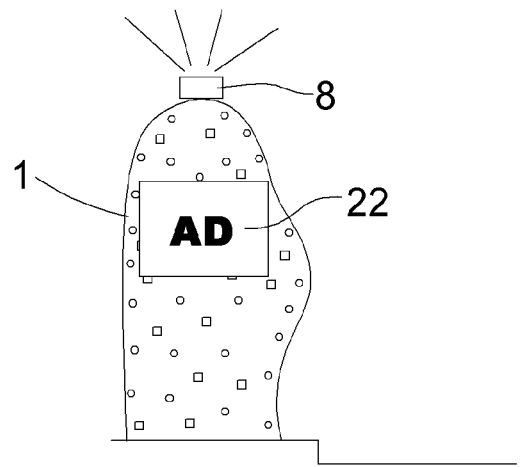

FIGS. 4A and 4B show an embodiment of the present invention made of generally more flexible sheets rather than rigid panels. Here, a fire hydrant 20 is covered with a cover 1 made of two sheets of the material with the offset openings between the inner and outer layers. While a fire hydrant is shown, any object may be protected. The material in this embodiment may be a flexible plastic such as plastic sheet (Mylar). The cover 1 can be secured to the fire hydrant or object by any means. In particular, a strap may be used. An optional light 8 is shown on top of the assembly. This light can be used for the dual purpose of marking the hydrant and to supply some heat into the interior of the system. If no light is used, the system will protect the hydrant 20 from sudden temperature swings (such as from a temperature above freezing to one well below freezing). With no light or other internal heat source, if the temperature stays below freezing for a long period of time, the hydrant can eventually freeze; however, with the system 1 in place over the hydrant 20, the freezing process takes much longer since there is no longer any direct convection from ambient air. For example, if the ambient temperature dips from 35 degrees F. to 25 degrees F., the hydrant will not freeze for many days. This is simply an example. The present invention works at any temperature.

The use of transparent sheets also allows solar heating during the daytime. Ultraviolet and visible light from the sun penetrates the sheets heating the covered object such as the fire hydrant 20. Because the present invention 1 almost totally eliminates convection cooling of the object, the object maintains an elevated temperature after the sun has set.

If a light source 8 is used, depending upon its heat output, it can delay the freezing process (or even prevent it altogether) by continually pumping heat energy into the interior of the system 1. The light source can also be used to mark the location of the hydrant or object. The breathing effect of the openings prevents excessive moisture buildup in the interior. An optional advertising or announcement panel 22 can be placed on the exterior of the system 1 if desired. The light 8 can be controlled by a temperature sensor 23 that turns it on when the interior of the system 1 becomes too cold. This is important if a battery 24 is being used to power the light. Optionally, the light unit can contain communication equipment that can be made to communicate with a remote control station using WiFi or Cellular telephone if it is desired to control hydrants and the like remotely. This is especially useful in cities where WiFi is becoming ubiquitous.

Figure 5:
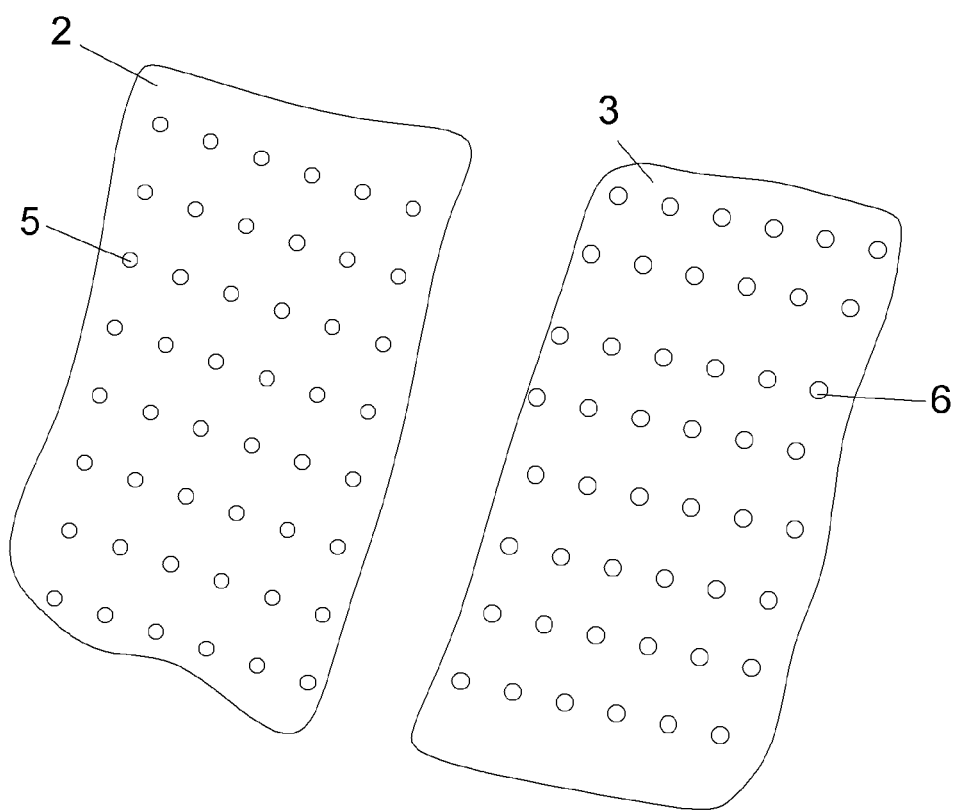
FIG. 5 shows the offset opening patterns in a front and back flexible sheet.

FIG. 5 shows flexible sheets of plastic used as front 2 and rear 3 panels with offset openings 5 and 6.

Figure 6:
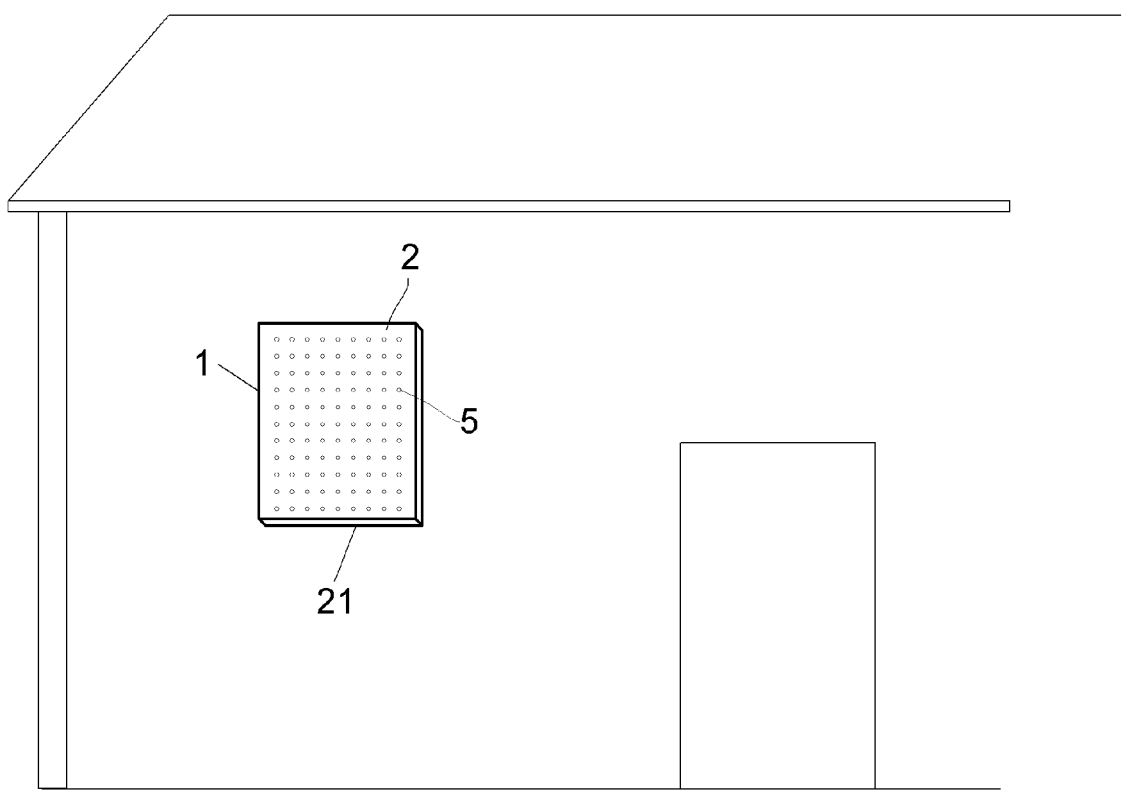
FIG. 6 shows a rigid embodiment being used to cover a window on a house.

FIG. 6 shows use of either the rigid or flexible embodiments of the present invention to cover a house window 21. The front panel 2 and front openings 5 can be seen.

The present invention has the advantages of reducing heating and air conditioning costs while creating a noise and climate protection shield that is particularly useful as a window or door covering. The present invention can provide additional protection, especially to windows, in hurricane and tornado regions. The system can be re-used and is thus environmentally friendly. Plywood purchased for window protection is usually either discarded or is not re-usable after becoming wet in a storm situation.

As attic insulation, the present invention can replace the pink fiber glass or other standard insulation with a solid base that can be used for storage.

The present invention using flexible material can be used to prevent fire hydrants and other objects from freezing in addition to making them safer and less prone to dangerous accidents such as collisions with bicycles or other accidents. The flexible design can also be used to cover plants such as flowers and vegetables to protect them from drastic temperature changes and overnight freezing as well as preventing frost buildup. Any object can be thermally protected by this technology.

Embodiments of the present invention, as described above, typically include two or more perforated sheets of material separated by spacers, shims or by any other method. The type of material is not important. A preferred material is plastic; however, any rigid or flexible material will work. The perforations or openings on the sheets, as described, are purposely not aligned to lower the diffusion flux. A typical panel of 48 inches by 72 inches could have, for example, 77 openings space evenly apart. However, the openings in the front and rear sheets are cut so that if the panels are stacked, the openings do not align. This is simply an example. Any size panel may be used with the present invention with any number of openings.

The perforations or openings can be any shape including circles, squares, stars or any other shape or cross-section configured into any variations of angles, patterns and designs.

Between the panels of window and door systems there can be optional drain openings or weep hole openings or drain tubes to remove excess moisture.

The present invention creates a better environment for a thermo-shield type of insulation structure. It allows a healthy breathing of a home due to the offset arrangement of the inside and outside openings. The product can be used over and over in addition to being more aesthetically appealing and user friendly.

Several descriptions and illustrations have been presented to aid in understanding the present invention. One with skill in the art will realize that numerous changes and variations may be made without departing from the spirit of the invention. Each of these changes and variations is within the scope of the present invention.

We claim:

1. A thermal insulation system comprising:
   first and second rigid panels having inner and outer surfaces mounted in opposition so that the inner surfaces are equidistant from to one-another resulting in an empty enclosed air space between the panels;
   each of the rigid panels having a plurality of openings allowing free air communication between the inner and outer surfaces, the plurality of openings forming patterns on each of the panels, said patterns arranged so that no opening on the first panel aligns with an opening on the second panel
   wherein the first and second panels are concentric cylinders.

2. The thermal insulation system of claim 1 wherein the first and second panels are configured to cover a fire hydrant.

3. The thermal insulation system of claim 2 wherein the thermal insulator has an attached battery-powered light.

4. The thermal insulation system of claim 3 wherein the battery-powered light is controlled by a temperature sensor.

5. The thermal insulation system of claim 3 wherein the battery-powered light is controlled remotely.

6. A thermal insulation system comprising:
   a first rigid tubular member;
   a second rigid tubular member of diameter larger than the first tubular member;
   the first and second tubular members mounted concentrically forming an empty enclosed air space;
   each of the tubular members having a plurality of holes penetrating sides of the tubular member allowing free air communication through the member;
   the holes in the second tubular member being offset from the holes in the first tubular member so that no hole on the first tubular member aligns with a hole on the second tubular member.

7. The thermal insulation system of claim 6 wherein the first and second rigid tubular members are made from transparent plastic.

8. The thermal insulation system of claim 6 wherein the first and second tubular members are adapted to cover a fire hydrant.

9. The thermal insulation system of claim 6 wherein the first and second tubular members are adapted to cover a plant.

10. The thermal insulation system of claim 6 wherein the system further comprises a battery-powered light.

11. The thermal insulation system of claim 10 wherein the battery-powered light is controlled by a temperature sensor.

12. The thermal insulation system of claim 10 wherein the battery-powered light is controlled remotely.

\* \* \* \* \*